INVENTORS.
George Hardenbergh
John D Goodell
BY Tenny Lode
Bailey, Stephens and Huettig
Attorneys INVENTORS
George Hardenbergh
John D Goodell
Tenny Lode
BY
Bailey, Stephens and Huettig
Attorneys

MAGNETIC PULSE CONTROLLING DEVICES

Filed May 17, 1954 4 Sheets-Sheet 3

INVENTORS
George Hardenbergh
John D Goodell
Tenny Lode
BY
Bailey, Stephens and Huettig
Attorneys May 3, 1960 G. HARDENBERGH ET AL 2,935,733

MAGNETIC PULSE CONTROLLING DEVICES

Filed May 17, 1954 4 Sheets-Sheet 4

Inventors
George Hardenbergh
John D Goodell
Tenny Lode

By Bailey, Stephens and Huettig
Attorneys

United States Patent Office 2,935,733
Patented May 3, 1960

2,935,733

MAGNETIC PULSE CONTROLLING DEVICES

George Hardenbergh, John D. Goodell, and Tenny Lode, St. Paul, Minn., assignors, by mesne assignments, to General Precision, Inc., a corporation of Delaware Application May 17, 1954, Serial No. 430,187

12 Claims. (Cl. 340—174)

This invention relates to information processing machines. In particular, the invention is directed to magnetic pulse controlling elements used as component parts of such machines.

In our co-pending application for "Information Processing Machines," filed December 17, 1953, Serial No. 398,658, now abandoned, a basic magnetic pulse controlling element has been disclosed and its construction both as a so-called A element and an S element. The objects of the instant invention are to improve upon these A and S elements and in particular with regard to their stability in operation. In the A element an object is to produce a pulse controlling element having an output pulse of controlled voltsecond integral, and reasonably controlled amplitude during the positive portion of a clock cycle, if, and only if, a positive pulse was received at either or both input terminals during the immediately preceding input time portion of the clock cycle. The input pulse is of similar characteristics as the output pulse. An object of the S element is to produce a magnetic pulse controlling element having properties similar to the element A, but having the logical function such that an output pulse appears if, and only if, there is no input pulse on any input line at input time. A further object applicable to both elements is to produce a pulse controlling element which has sufficient energy in the output pulse to drive up to three other pulse controlling elements without significant influence on the output pulse by the load imposed on the output line.

In general, these objects are obtained by incorporating a magnetic core in an electrical circuit having the core windings so proportioned that a controlled output pulse is obtained, together with means for preventing feed back currents to the input lines. More specifically, this is accomplished by placing unilateral impedance means such as a diode in a line connected between the output terminal of the output winding and the junction of the clock winding with a resistor which is connected in series with the clock winding to the ground return. The use of this impedance means assists in stabilizing the amplitude of output pulse upon a variation in load on the output line of the output winding.

Figure 1:
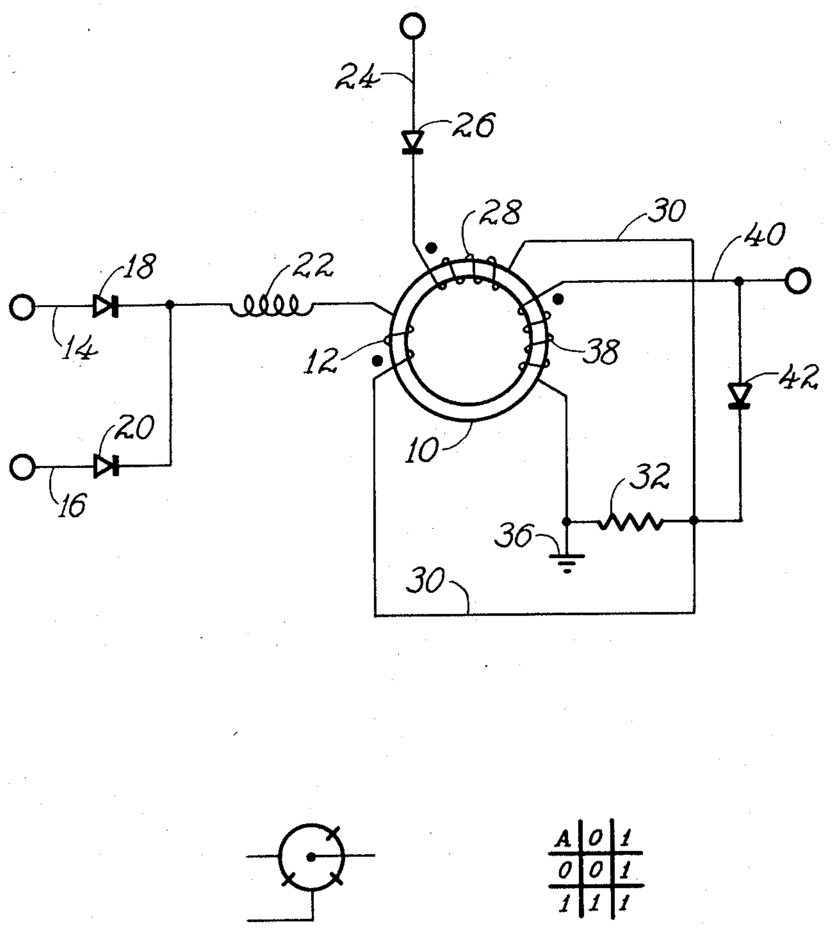
Figure 2:
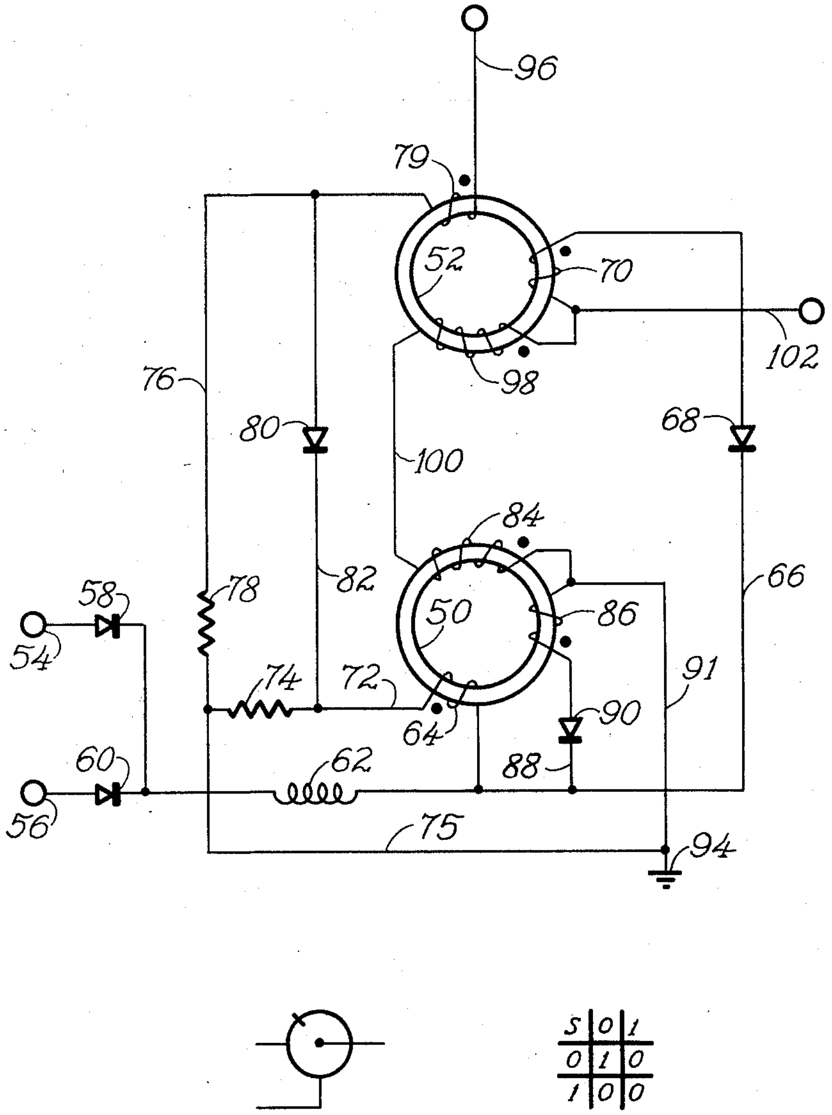
Figure 3:
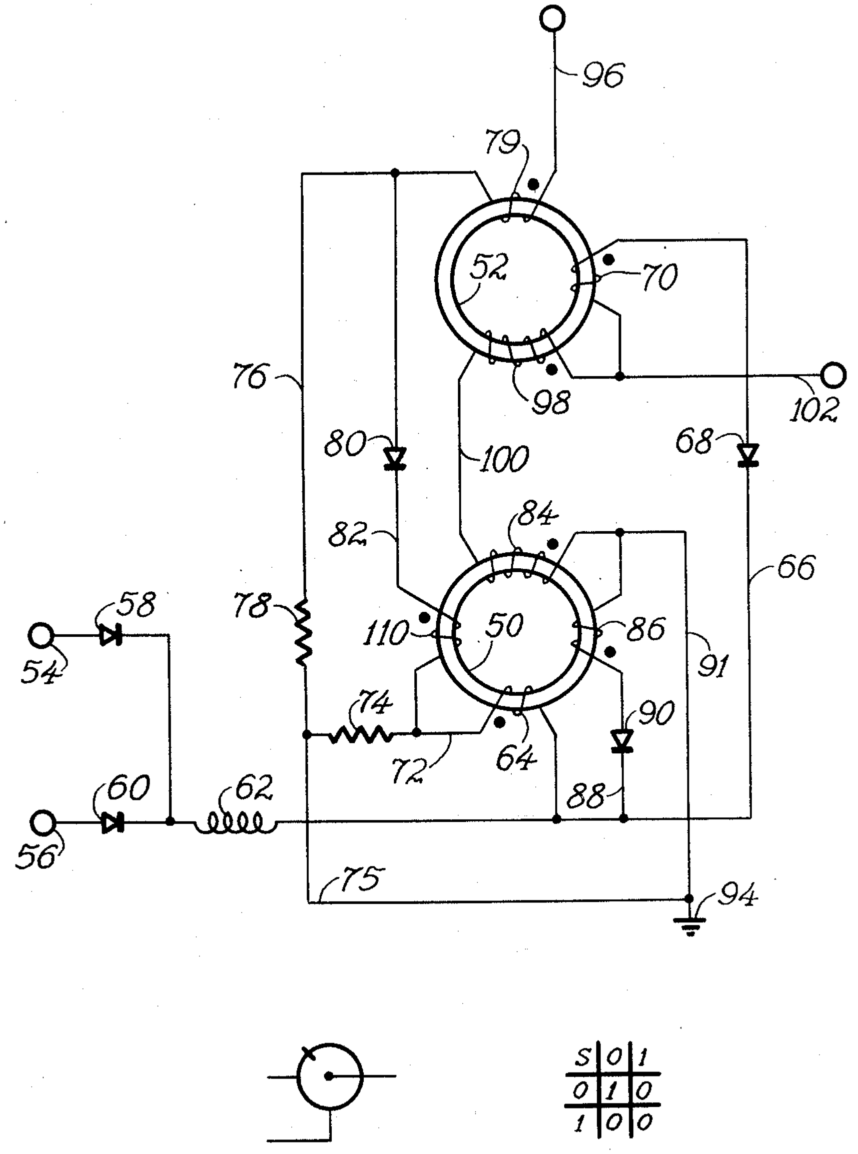
Figure 2A:
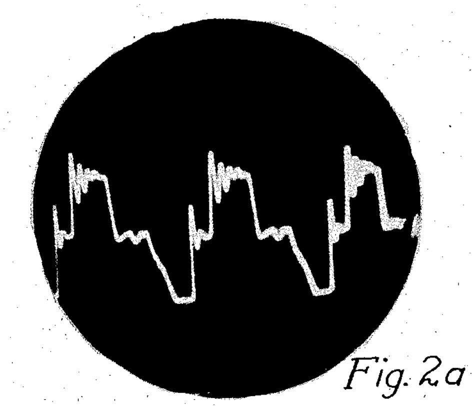
Figure 2B:
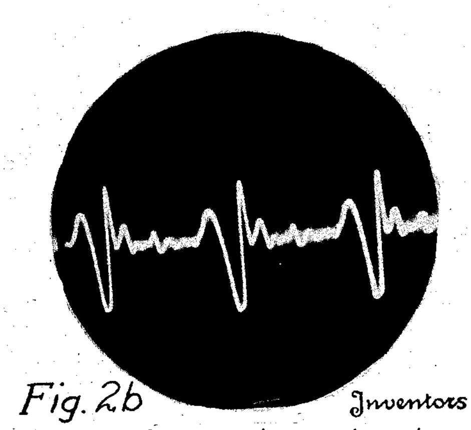

The means by which the objects of the invention are obtained are described more fully with reference to the accompanying drawings, in which:

Figure 1 is a circuit diagram of a pulse controlling element;

Figures 1*a*, 1*b*, 1*c* and 1*d* are oscillograph curves illustrating the operation of the A element;

Figure 2 is a circuit diagram of an S pulse controlling element;

Figures 2*a* and 2*b* are oscillograph curves of the output of the S element; and Figure 3 is a circuit diagram of a modified S pulse controlling element.

In Figure 1 the magnetic core 10 is provided with an input winding 12. Input lines 14 and 16, respectively, are provided with input diodes 18 and 20 and are connected in parallel. A choke 22 is inserted in the line connecting the parallel input circuit to winding 12. A clock pulse line 24 is connected to diode 26 to clock winding 28, and is further connected in series through line 30 to input winding 12. Both windings 12 and 28 are connected through resistance 32 to ground 36. Output winding 38 is likewise connected to ground 36 and to output line 40. The impedance means joined to output line 40 is a diode 42 joined to line 30. In some instances, it may also be desirable to connect input winding 12 in series with resistor 32 and to ground 36 as shown. In the drawings, the black ball at a terminal of each winding indicates the end of the winding which is positive during a flux change from negative remanence to positive saturation.

In the construction of this pulse controlling element, core 10 is a $\frac{3}{16}$ inch diameter Toroid having 20 wraps of $\frac{1}{8}''$ x 0.000125″ 4–79 Mo Permalloy ribbon (rectangular annealed). The wire used for the windings is No. 39 wire, with winding 12 having 75 turns, windings 28 and 38 both having 150 turns. The clock voltage amplitude is from 25 to 35 volts of 100 kc. trapezoidal wave Choke 22 is 500 $\mu$h., and resistance 32 is 470 ohms. Thus, both the input and output times are 5 microseconds.

In describing the operation of this circuit, the magnetic core is said to be driven positively or driven negatively, in order to express the sense of driving the magnetic core to remanence in one direction, and then driving it to remanence in the opposite direction. The clock pulses tend to drive the core to positive saturation, and in the interval between successive positive clock pulses an input pulse may be applied to the core. In the logical system in which these elements are used, the absence of an input pulse at input time is considered as a signal having the definite value of zero upon which the pulse controlling element can act.

In Figure 1 is it desired to produce an output pulse of controlled voltsecond integral and reasonably controlled amplitude during the positive portion of the clock cycle if, and only if, a positive pulse was received at either or both input lines 14 and 16, respectively, during the immediately preceding negative portion of the clock cycle. The input pulse is similar to the output pulse with respect to the voltsecond integral and approximate amplitude.

A positive pulse in clock line 24 will send a current through diode 26 into clock winding 28, line 30, resistance 32, to ground 36 to drive the core to positive remanence. During the following negative half clock cycle, diode 26 becomes negatively biased over a period corresponding to input time. During input time diode 26 is thus nonconducting, and a positive signal applied at either input line 14 or 16 will be conducted through choke 22, winding 12, line 30 through resistance 32 to ground 36. The circuit constants are such that somewhat less than ½ the voltsecond integral of the input pulse will be lost in either diode 18 or 20 and choke 22, resistance 32 and the resistance and leakage inductance in winding 12. The remaining voltseconds are received in winding 12 and cause a flux change in the core from positive remanence to negative saturation. The circuit constants are so chosen that the most unfavorable combination of tolerances will still permit negative saturation to be reached. The 1:2 step-up ratio between windings 12 and 38 means that half as many voltseconds are required at winding 12 as at winding 38 to produce the same approximate flux change for all the pulse controlling elements in the circuit so that the input pulses are of about the same magnitude.

The energy required in winding 12 for this flux change in core 10 from positive remanence to negative saturation is essentially only the loss in the core since the voltage induced by this flux change in winding 38 is negative, and this will not cause a current flow through diode 42 or in pulse controlling elements connected as a load on output line 40 since such pulse controlling elements have diodes oriented the same as diodes 18 and 20, which will be non-conducting for a negative pulse. The voltage induced in clock winding 28 by an input pulse is in such a direction as to drive the end connected to diode 26 negative. However, the large negative bias applied at the clock terminal 24 at this time is sufficient to maintain the diode in a non-conducting state. Thus, if an input pulse occurs at either input terminal, the core is driven to negative saturation, and at the conclusion of the pulse the core has settled to negative remanence, and no effective output signal has been made.

Now, when the next positive clock pulse is applied at clock line 24, a current flows through diode 26, winding 28, line 30, resistance 32 to ground 36. The current in clock winding 28 is in such a direction as to drive the core 10 to positive saturation. As the core was previously at negative remanence, as a function of a previous input signal the change to positive saturation creates a large flux change in the core, and induces a voltage in output winding 38 so as to make the output terminal positive, and thus provides a suitable output signal to be passed through line 40 to further pulse controlling elements. Diode 42 has a voltage regulating function in that the core 10 is constrained to move no faster than a speed such that the sum of the voltages induced in windings 28 and 38 by the flux change is approximately equal to the clock voltage. With the circuit constants used, this makes the output pulse amplitude approximately ½ the clock voltage. If too much load current is drawn in line 40, the flux will not change sufficiently rapidly to permit diode 42 to conduct, and the regulating action will be lost. However, the circuit constants have been so selected that a load of several pulse controlling elements on line 40 will not cause this to occur.

The voltage induced in input winding 12 is in a direction such as to drive the input terminal negative. However, the bottom terminal of winding 12 as shown in Figure 1 is, due to the action of diode 42 and the turn ratios of the windings, stabilized at a positive potential of ½ the clock voltage, while the induced voltage in input winding 12 is, by the same means, stabilized at ¼ the clock voltage. Thus, during output time, the input diodes are biased to ¼ of the clock voltage in a non-conducting direction.

In the case where no input signal was received, at the beginning of clock pulse positive half cycle, the core is resting at positive remanence. Upon receiving a clock pulse the core will be moved from positive remanence to positive saturation producing a small positive spike of noise with a voltsecond integral very small compared to the 1 output pulse described above. Not only is the amplitude of this spike limited as above, but its duration is very much less than the 1 pulse. For the remainder of the 0 output time, the output voltage is zero and the full clock voltage is fed to resistance 32 and appears as back bias on diodes 18, 20 and 42. These same conditions also occur on the 1 output after the core reaches positive saturation, and the circuit constants are chosen so that positive saturation will be reached with minimum clock amplitude and with a plurality of 3 pulse controlling elements connected in parallel to line 40, before the end of the positive half cycle of the clock, so that a stable starting point for the next input half cycle and standardized output pulse is insured.

Figure 1A:
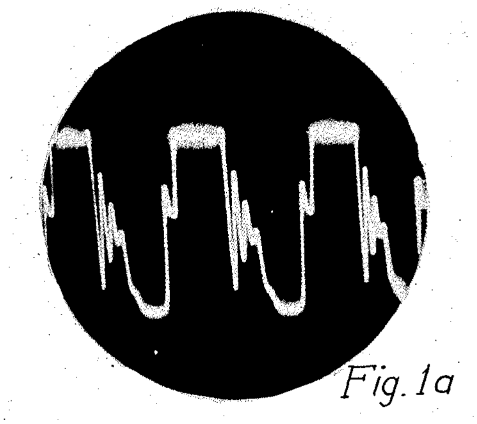
Figure 1B:
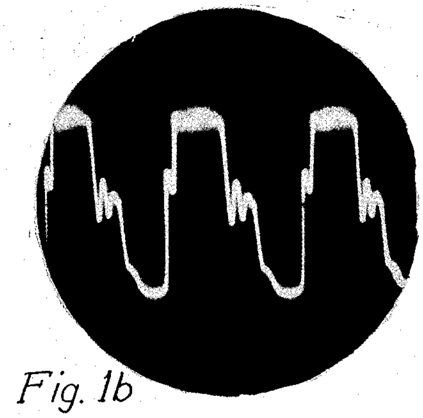

The effect of the use of diode 42 is clearly shown in Figures 1*a–d*. These oscillograph curves are of the voltage in output line 40 under the following conditions:

In Figure 1*a* the pulse controlling element is driving one following pulse controlling element connected in line 40. In Figure 1*b*, three pulse controlling elements are connected in line 40. The squared peaks show that an output pulse of well controlled voltsecond integral and reasonably controlled amplitude is obtained.

Figure 1C:
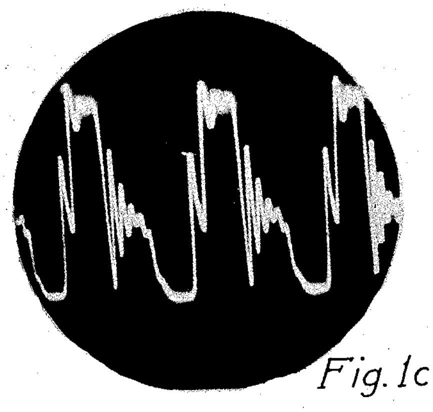
Figure 1D:
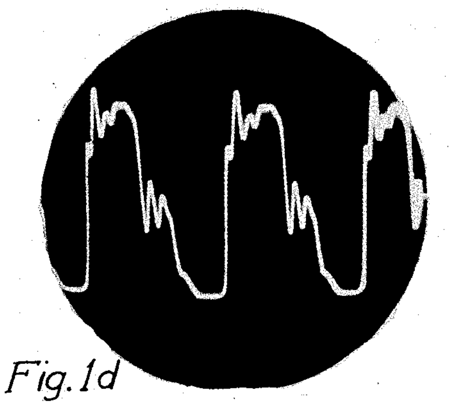

In Figures 1*c* and 1*d* the diode 42 has been removed from the circuit of Figure 1. In Figure 1*c*, the element is driving one element. In Figure 1*d*, the pulse controlling element, without diode 42, is driving three elements. A comparison of these figures shows that the voltsecond integral in the positive pulses of Figures 1*a* and 1*b* is closely similar and well controlled by the magnetic characteristics of the core. This is also true in Figures 1*c* and 1*d*. But it is noted that in Figures 1*a* and 1*b* the amplitude of the positive pulses has also been well controlled by the action of diode 42, whereas the absence of diode 42 allows the amplitude of the positive pulses in Figure 1*c* to be high by comparison with Figure 1*d*.

The choke 22 in the circuit aids in discriminating against the small spike noise for a 0 by slowing the rate of rise of current in the input circuit and reducing the amount of flux change caused by this input. It also delays the response to a 1 input, and will give back the stored energy, if needed, after the input pulse is over. Thus, it contributes to the snap action of the device by reducing the response to small signals, and aiding the response to large ones.

The S element shown in Figure 2 has output properties similar to those of element A and drive characteristics similar to element A, but with the logical function that an output 1 appears if, and only if, there is no input on any input line at input time. The element is composed on an input core 50 connected to an output core 52, input lines 54 and 56, respectively, and diodes 58 and 60 which are connected in parallel and lead through choke 62 to input winding 64. The inlet terminal of input winding 64 is connected by line 66 containing diode 68 to one side of an outlet winding 70 on core 52. The outlet terminal of winding 64 is connected through line 72 containing resistance 74 and through line 75 to ground 94, and line 76 containing resistance 78 to the outlet terminal of clock pulse winding 79 on core 52. A diode 80 in line 82 is connected in parallel across resistance 74 and 78.

Widings 84 and 86 on core 50 are connected in series, and the output terminal of winding 86 is connected to line 66 through line 88 containing diode 90. Line 91 extends from tap 92 between windings 84 and 86 to ground 94.

In core 52 the clock pulse winding 79 is connected to a clock providing alternate positive and negative pulses through line 96. The outlet terminal of winding 79 has alternated paths to ground 94. One is through line 76 containing resistor 78 and through line 75. The other is through line 82, diode 80 and line 72 and resistor 74 to ground 94. Winding 70 is connected in series to winding 98, which winding in turn is connected to winding 84 by line 100. The output line 102 is joined to the tap between windings 70 and 98.

Cores 50 and 52 are constructed as set forth for the core 10 of element A in Figure 1. The circuit components have the following values:

| | | |
|---|---|---|
| Winding 64 | turns | 75 |
| Winding 84 | do | 150 |
| Winding 86 | do | 75 |
| Winding 98 | do | 150 |
| Winding 70 | do | 75 |
| Winding 79 | do | 75 |
| Resistance 74 | ohms | 470 |
| Resistance 78 | K | 2.7 |
| Choke 62 | μh | 500 |

The basic principle upon which the circuit operates is to provide a standard output pulse from core 52 at each output time, and cancel it by an equal and opposite pulse from core 50 when there has been an input signal to core 50. During the input half cycle the core 52 is driven by the negative clock signal received in clock winding 79 through line 96. During the input half cycle a current flowing through line 96 through winding 79, lines 76 and 75 to ground 94 energizes winding 79 and drives core 52 to negative saturation. Diode 80 in line 82 is biased to the non-conducting state by the voltage drop in resistance 78.

Assuming that there is no input signal in lines 54 and 56, and assuming that the previous action has left core 50 at positive remanence, the following occurs. With no input signal, no voltages are induced in windings 64, 86, 84 on core 50. The output terminal 102 is driven negative by the voltage induced in winding 98 which does not produce any loading on output line 102 due to the input diodes of the driven pulse controlling elements connected to this output line, as in the case of element A. Diode 68 is biased to the non-conducting state by the sum of the voltages induced in windings 98 and 70.

When the output half cycle occurs, core 52 is driven from negative remanence to positive saturation by the positive clock potential received in winding 79. Diode 68 functions in a manner similar to diode 42 in element A so as to develop approximately ½ of the clock voltage across winding 98, ¼ the clock voltage across winding 70, and ¼ the clock voltage across winding 79. Thus, since winding 98 has the same number of turns as the output winding 38 of element A, the output pulse of an A element and an S element will have approximately the same voltsecond integral, and by the regulating mechanism described above, the pulses will be approximately the same amplitude. The effects of the output current and the current in diode 68 flowing in the windings of core 50 are to move core 50 from a positive remanence to positive saturation, and the induced voltages in winding 84 will subtract from the output pulse, thus producing a slight decrease in the output.

The means by which core 50 is driven to positive saturation is covered more fully later. When a 1 output is being produced as described above, the input diodes 58 and 60 are biased in a non-conducting direction to the extent of ¾ the clock amplitude, or the drop across resistance 74. The circuit constants are shown so that the regulating action of diode 68 during output time is effective for driving a maximum of three other pulse controlling elements connected to output line 102. The curve for the output signal is shown in Figure 2*a*. After core 52 reaches saturation, all the clock voltage appears across resistances 74 and 78, and thus also appears as a bias on the input diodes in the non-conducting direction.

If an input signal is received at either input lines 54 or 56, or both, it will drive core 50 to negative saturation in the same manner as an input to an A pulse controlling element, the components of the primary input circuit being similar. Winding 86 has a negative voltage induced in it which biases diode 90 in the non-conducting direction. There is, however, no synchronizing means to ensure that cores 50 and 52 have the same rate of flux change during the input, and thus the output potential, although it must average to zero, since it is the difference of the voltage induced in two equal windings by two equal flux changes, may be either positive or negative depending upon the relative rates of flux change in the two cores. Thus, if core 50 is moving more rapidly, the output terminal will be positive and if core 52 is moving more rapidly, the output will be negative. In general, during the input interval there is a transient of both polarities. Loading of winding 84 by the positive excursion of these transients is reduced by the following features.

(*a*) As has been shown for the A element and for the S element producing a 1 output, and as will be shown for the case of the S element producing a zero output, there is always a back bias on the input diodes of pulse controlling element S at least ¼ the clock voltage during output time. Since output time of the receiving pulse controlling elements connected to output line 102 is input time of the sending pulse controlling element, conduction of the receiving input diodes cannot commence until this output transient during input time exceeds ¼ the clock amplitude.

(*b*) The input choke corresponding to choke 62 on the receiving pulse controlling element will prevent the rapid growth of current for excursions above this amplitude.

(*c*) Any loading that does occur will act on core 52 in winding 98 so as to accelerate its flux change, and unless core 52 has already reached negative saturation it should require little additional current to produce a large acceleration. Empirically, no significant amount of additional loading has appeared from this cause. It is noted that diode 68 can cause loading by conduction only slightly under the conditions that core 52 reaches negative saturation before core 50. To sum up, resistance 78 is selected as high as possible so that for core 52 the rate of flux change will be as slow as possible, and preferably slightly lower than core 50, but resistance 78 must be low enough so that core 52 will reach negative saturation at minimum clock amplitude.

Assuming that cores 50 and 52 are at negative remanence at the start of the output portion of the clock cycle, core 52 is driven toward positive saturation as above described. The flux change in core 52 causes a voltage in windings 98 and 70 and a current in line 66, which is greater than the voltage eventually produced in output line 102 and thus diode 68 conducts. However, when diode 68 conducts, a current is developed in winding 64, and proportionately through lines 76 and 82. This proportion will also apply to the current flowing through diode 68 to line 72. This current in winding 64 tries to drive core 50 to negative saturation. This current through diode 68 must come from line 100 through windings 70 and 98, and will be increased by current taken from line 102, if any. The current in winding 84 from line 100 tends to drive core 50 towards positive saturation. The current in line 100 is at least as great as that in line 66 and is flowing through winding 84 having twice as many turns as winding 64. The net effect is to drive core 50 toward positive saturation. However, as core 50 moves the positive voltage induced in winding 86, it tends to make diode 90 conduct, and this diode will conduct when both cores 50 and 52 are changing flux at the same rate. The current in winding 86, due to the conduction of diode 90, is in such a direction as to oppose the change of flux in core 50, and the current through diode 90 also flows through winding 64 in such a direction to oppose the change in flux in core 50. Thus core 50 is constrained against any further rate of flux once it is synchronized with the rate of flux change in core 52. The cores move at such a rate that ⅔ of the clock voltage appears across resistances 74 and 78, and the input diodes 58 and 60 are biased to ⅓ of the clock voltage. The winding voltages are as follows:

| | Clock voltage |
|---|---|
| 64 | ⅓ |
| 84 | ⅔ |
| 86 | ⅓ |
| 98 | ⅔ |
| 70 | ⅓ |
| 79 | ⅓ |

The output voltage is zero since windings 84 and 98 are oppositely poled, and the voltages induced in the windings are about equal. Since both cores are moving at ⅔ the speed that core 52 moves in the above described case when there is no input to core 50, they will both reach positive saturation early, and assuming perfect matching, ideal diodes, etc., simultaneously. At this time, the full clock voltage appears across resistances 74 and 78 and also as a bias across input diodes 58 and 60. In a practical device there is a small positive spike for a zero output occurring about the time saturation is reached, due probably to an imperfect matching of cores, lack of ideal diode characteristics, and the fact that core 50 is driven harder than core 52, and thus is reaching a slightly higher saturation as core 52 drops back to positive remanence. However, this spike is comparable in area to the spike occurring from an A element for zero output, and is successfully ignored by the next pulse controlling element connected to output line 102 in a similar manner. The curve for the current in line 102 when there is no input is shown in Fig. 2*b*.

In the modified form of the S element shown in Figure 3, a winding 110 is inserted on core 50, this winding being in series with the diode 80 in line 82, and having its opposite terminal connected to winding 64. The construction of the cores and the values of the windings and resistances are the same as in Figure 2, with the addition that winding 110 has 75 turns. Structurally, the circuit otherwise is similar to that of Figure 2, but provides a more effective clock drive to core 50.

When there is no input signal, the performance of this circuit follows that as described for Figure 2, since there is no drop across winding 110 except during the small transient flux change of core 50 from residual to positive saturation and back. As in the circuit of Figure 2, this results in a slight reduction in the size of the output pulse.

When an input pulse is received on either or both of input lines 54 and 56, respectively, during input time, a voltage is induced in winding 110 which reduces, but does not overcome, the bias on diode 80, so there is no change in input loading.

Assuming now that both cores 50 and 52 are at negative remanence at the start of the output portion of the clock cycle, core 52 is driven toward positive saturation as in Figure 2. However, the current through line 82 into winding 110 tends to drive core 50 toward positive saturation. The control action now is that core 50 is being moved more strongly by winding 110.

Conduction in diode 90 tends to reduce the rate of flux change in core 50. Conduction in diode 68 tends to increase the rate of flux change in core 50 and reduce the rate of flux change in core 52. The proportionate current flow through the circuit components is self adjusting until the two cores are being moved at the same rate of flux change. At this stabilized point, ½ the clock voltage appears across resistor 74, and ¾ of the clock voltage appears across resistor 78.

| | Clock voltage |
|---|---|
| Winding 64 | ¼ |
| Winding 84 | ½ |
| Winding 86 | ¼ |
| Winding 98 | ½ |
| Winding 70 | ¼ |
| Winding 79 | ¼ |
| Winding 110 | ¼ |

Thus, somewhat less clock power is used in this condition, since reaching of saturation is delayed and the cores have the same standard rate of change of flux in all cases. The performance of the two circuits is essentially identical. This modified circuit of Figure 3, while having good performance, is somewhat more difficult to fabricate than the circuit of Figure 2.

In both the A and S pulse controlling elements described, the use of the diode 42 in Figure 1 and the diode 68 in Figures 2 and 3 is particularly valuable in stabilizing the rate of change of the flux in the magnetic cores. In Figures 2 and 3 the combination of diodes 68 and diodes 90 also has a similar advantage of assisting in the stabilization and equalization of the rate of change of flux in the two cores.

Having now described the means by which the objects of the invention are obtained:

We claim:

1. A pulse controlling element comprising a magnetic core saturable with fluxes of opposite polarities and having properties for retaining these fluxes even after the interruption of any driving forces for producing the fluxes, means for applying an input pulse to said core to produce a flux change in the core in a first direction, means for applying successive clock pulses to said core in the intervals between the input pulses to produce flux changes in the core in a second direction opposite to the first direction, said clock means including a diode and a resistor in series for maintaining a voltage bias across said diode, means for producing output pulses from said core upon the production of changes in flux by said clock pulses, and diode means and the resistor being included in said output pulse means for controlling the amplitude of said output pulses in accordance with the voltage across said resistor to make the amplitude substantially independent of load variations.

2. A pulse controlling element as in claim 1, said output producing means including a winding on said core, an output line connected to one end of said winding, and the opposite end of said winding being connected to a ground return, and a diode connected between said output line and the junction of said clock pulse means with said resistor, said diode being principally conductive toward said ground return.

3. In combination, a member saturable with magnetic fluxes of first and second polarities and having properties of retaining the magnetic fluxes of the first and second polarities upon the interruption of any driving force for producing the fluxes, a plurality of windings disposed in magnetic proximity to the magnetic member, means for providing cyclic signals and for introducing the cyclic signals to a first winding in the plurality to produce magnetic fluxes of the first polarity during a first portion of each cyclic signal, means including first unidirectional means and an impedance connected in a circuit with the last mentioned means and the first winding to prevent the passage of current through the circuit upon any change of flux during a second portion of each cyclic signal, means for providing input signals and for introducing the input signals to a second winding in the plurality during the introduction of the second portion of the cyclic signals to the first winding to produce changes of flux in the magnetic member from the first polarity to the second polarity, means including second unidirectional means connected in a circuit with the last mentioned means and the second winding for providing for the introduction to the winding of signals having only a polarity and in a direction for producing fluxes of the second polarity in the member, and means including a third winding in the plurality and including third unidirectional means coupled between said third winding and said impedance for producing output signals having regulated characteristics upon changes of flux in the magnetic member from the second polarity to the first polarity and regardless of variations in the load presented to the third winding over a considerable range of values.

4. In combination, a member saturable with magnetic fluxes of first and second polarities and having properties of retaining the magnetic fluxes of the first and second polarities after the interruption of any current flow, a plurality of windings magnetically coupled to the member to produce fluxes in the member upon the flow of current through the windings and to have voltages induced in them upon the production of fluxes in the magnetic member, means associated with a first winding in the plurality for introducing alternating clock signals to the winding to produce fluxes of the first polarity during the introduction of portions of the clock signals having a first polarity, first unidirectional means connected in a circuit with the last mentioned means and the first winding to prevent the flow of current through the winding upon changes of fluxes in the magnetic member during the introduction of portions of the clock signals having a second polarity, impedance means connected in the circuit with the first winding and the first unidirectional means for producing voltages across the impedance means upon the flow of current through the winding during the portions of the intermittent signals having the first polarity, means associated with a second winding in the plurality for introducing input signals to the winding to produce fluxes of the second polarity in the magnetic member during the introduction of the portions of the clock signals having the second polarity, a third winding in the plurality being provided to produce output signals upon changes of flux in the magnetic member from the second polarity to the first polarity, and means including second unidirectional means and said impedance means connected in a circuit with the third winding for stabilizing the characteristics of the output signals induced in the third winding with changes of load values.

5. Apparatus as set forth in claim 4 in which means including an inductance are connected in the circuit with the input means, the second unidirectional means and the second winding of said first member for inhibiting the introduction of spurious signals to the second winding of the first member and for providing for an enhanced reaction of the second winding of the first member to signals from the input means.

6. In combination, first and second members each saturable with fluxes of first and second polarities and having properties of retaining the fluxes of first and second polarities after the interruption of any driving forces for producing the fluxes, means for providing intermittent signals alternately having first and second polarities, means including first windings on the first and second members for introducing the intermittent signals of first polarity to the windings for the production of fluxes of first polarity in the members and for providing for the introduction of the intermittent signals of second polarity to the first winding on the second member for the production of fluxes of the second polarity in the second member and for preventing the introduction of the intermittent signals of second polarity to the winding on the first member, means for providing input signals during the production of the intermittent signals having the second polarity, circuit means including a second winding on the first member for receiving the input signals to produce fluxes of the second polarity in the first member, and circuit means including the first winding on the first member and a second winding on the second member serially connected with said first winding on the first member for producing output signals upon changes of flux in one of the members from the second polarity to the first polarity without corresponding changes of flux in the other member.

7. In combination, first and second members each saturable with fluxes of first and second polarities and having properties of retaining the fluxes of first and second polarities even after the interruption of any driving force, first and second pluralities of windings respectively coupled magnetically to the first and second members, means including first windings in the first and second pluralities and including first unidirectional means and alternating clock means for introducing clock signals of first and second polarities to the first winding in the second plurality to produce magnetic fluxes of the first and second polarities in the second member and for introducing to the first winding in the first plurality the portions of the clock signals having the first polarity to produce magnetic fluxes of the first polarity in the first member, means including a second winding in the first plurality and including second unidirectional means and input means for introducing input signals to the second winding of the first plurality during the production of the portions of the clock signals having the second polarity to produce fluxes of the second polarity in the first member, and means including a second winding of the second plurality and the first winding of the first plurality and including third unidirectional means for producing a flow of current through both windings and the third unidirectional means in the portions of the clock signals having the first polarity to produce output signals upon an induction of signals in only the second winding and to obtain a cancellation of any output signals upon an induction of signals in both windings.

8. Apparatus as set forth in claim 7 in which means including a third winding magnetically coupled to the first member and including fourth unidirectional means are included to regulate the changes of flux for the production of output signals having stabilized characteristics over a considerable range of load values.

9. In combination, first and second members each saturable with fluxes of first and second polarities and having properties of retaining the fluxes of first and second polarities upon the interruption of any driving forces for producing the fluxes, a first winding on the second member, member for providing intermittent signals alternately having first and second polarities, impedance means, electrical circuitry including the intermittent signal means, the first winding and the impedance means for introducing the signal portions of first and second polarities to the winding to produce fluxes of the first and second polarities in the second member, a second winding on the second member, first and second windings on the first member, first unidirectional means, electrical circuitry including the first unidirectional means and the second windings on the first and second members for producing current flow through the windings upon the induction of signals in the second winding on the second member by changes of flux in the second member from the second polarity to the first polarity to produce fluxes of the first polarity in the first member, second unidirectional means, electrical circuitry including the second unidirectional means for providing input signals during the introduction to the first winding on the second member of the portions of the intermittent signals having the second polarity and for introducing the input signals to the first winding on the first member to produce fluxes of the second polarity in the first member, third unidirectional means, and means including the second windings on the first and second members and including the third unidirectional means for producing output signals upon the induction of output signals in the second winding on the second member without the simultaneous induction of output signals in the second winding on the first member.

10. In combination, first and second members each saturable with fluxes of first and second polarities and having properties of retaining the fluxes of first and second polarities even after the interruption of any current flow for producing the fluxes, a first winding on the second member, means for providing intermittent signals alternately having first and second polarities, a first resistance, a second resistance, first unidirectional means, electrical circuitry including the intermittent signal means, the first winding, the first resistance and the first unidirectional means for introducing the intermittent signal portions of first polarity to the winding to produce fluxes of the first polarity in the second member, electrical circuitry including the intermittent signal means, the first winding and the second resistance for introducing the signal portions of second polarity to the winding to produce fluxes of the second polarity in the second member, a second winding on the second member, first and second windings on the first member, second unidirectional means, electrical circuitry including the second unidirectional means and the second windings on the first and second members for producing current flow through the second windings on the first and second members upon the induction of signals in the second winding on the second member by changes of flux in the second member from the second polarity to the first polarity to produce fluxes of the first polarity in the first member and for preventing current flow through the second windings on the first member upon the induction of signals in the second winding on the second member by changes of flux in the second member from the first polarity to the second polarity, third unidirectional means, electrical circuitry including the third unidirectional means for providing input signals during the introduction to the first winding on the second member of the portions of the intermittent signals having the second polarity and for introducing the input signals to the first winding on the first member to produce fluxes of the second polarity in the member, and means including the second winding on the first and second members and including the second unidirectional means for producing output signals only upon the induction of output signals in the second winding on the second member without the simultaneous induction of output signals in the second winding on the first member.

11. Apparatus as set forth in claim 10, including a third winding on a first member, fourth unidirectional means, means including the first and third windings on the first member and the fourth unidirectional means for stabilizing the characteristics of the output pulses even with considerable load variations.

12. A pulse controlling element, including a magnetic core having properties of retaining the fluxes of first and second polarities after the interruption of any driving forces for producing the fluxes; an input winding coupled to said magnetic core for receiving input signals and for producing a flux of said first polarity in said core; means for applying successive clock pulses to said core in the intervals between input signals to produce a flux of said second polarity in said core, said means including a clock winding coupled to said magnetic core, a terminal for receiving clock pulses coupled to one side of said clock winding, and a resistor coupled to the other side of said clock winding; an output winding coupled to said core for producing an output pulse; an asymmetrically conducting impedance element connected to one side of said output winding for controlling the amplitude of the output pulse in accordance with the potential across said resistor due to the clock pulse; electrical circuit means connecting one terminal of said impedance element to one side of said resistor and also to said clock winding; and electrical circuit means connecting the other side of said output winding to the other side of said resistor.

References Cited in the file of this patent

UNITED STATES PATENTS

| | | |
|---|---|---|
| 2,708,722 | An Wang | May 17, 1955 |
| 2,709,798 | Steagall | May 31, 1955 |
| 2,751,546 | Dimmer | June 19, 1956 |

OTHER REFERENCES

A publication entitled, "Magnetic Binaries In The Logical Design Machines," by Saunders, published May 1952 in the Proceedings of Association for Computing Machinery (pages 226–228 relied upon).